US007120799B2

(12) United States Patent
Leung et al.

(10) Patent No.: US 7,120,799 B2
(45) Date of Patent: Oct. 10, 2006

(54) METHOD AND APPARATUS FOR DUAL HARDWARE AND SOFTWARE CRYPTOGRAPHY

(75) Inventors: Lok Yan Leung, Austin, TX (US); Anthony Joseph Nadalin, Austin, TX (US); Bruce Arland Rich, Round Rock, TX (US); Theodore Jack London Shrader, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 974 days.

(21) Appl. No.: 09/738,243

(22) Filed: Dec. 15, 2000

(65) Prior Publication Data
US 2002/0078348 A1 Jun. 20, 2002

(51) Int. Cl.
*H04L 9/00* (2006.01)

(52) U.S. Cl. .................... 713/189; 380/30; 713/172; 713/194

(58) Field of Classification Search .............. 380/28, 380/286, 30, 37, 49; 709/250
See application file for complete search history.

(56) References Cited

U.S. PATENT DOCUMENTS

| 5,048,086 | A | | 9/1991 | Bianco et al. .............. 380/28 |
| 5,201,000 | A | * | 4/1993 | Matyas et al. .............. 380/30 |
| 5,343,527 | A | | 8/1994 | Moore .......................... 380/4 |
| 5,612,682 | A | * | 3/1997 | DeLuca et al. ............ 340/5.74 |
| 5,651,067 | A | * | 7/1997 | Ahrens et al. .............. 713/193 |
| 5,706,489 | A | | 1/1998 | Chi et al. ................... 395/569 |
| 5,778,072 | A | * | 7/1998 | Samar ......................... 380/30 |
| 5,835,600 | A | * | 11/1998 | Rivest ......................... 380/44 |
| 5,901,227 | A | | 5/1999 | Perlman ...................... 380/21 |
| 6,028,939 | A | * | 2/2000 | Yin ............................ 713/189 |
| 6,070,198 | A | | 5/2000 | Krause et al. .............. 709/321 |
| 6,122,742 | A | | 9/2000 | Young et al. ............... 713/201 |
| 6,393,565 | B1 | * | 5/2002 | Lockhart et al. ........... 713/172 |
| 6,523,119 | B1 | * | 2/2003 | Pavlin et al. ............... 713/192 |
| 6,671,809 | B1 | * | 12/2003 | Perona et al. .............. 713/200 |
| 6,672,505 | B1 | * | 1/2004 | Steinmetz et al. ......... 235/379 |
| 6,963,980 | B1 | * | 11/2005 | Mattsson ................... 713/194 |
| 2002/0083318 | A1 | * | 6/2002 | Larose ....................... 713/164 |

OTHER PUBLICATIONS

John Leach Computers & Security, vol. 14, No. 5, XP-004002047, pp. 385-389, "Dynamic Authentication for Smartcards", 1995.*

* cited by examiner

*Primary Examiner*—Kambiz Zand
*Assistant Examiner*—Carl G. Colin
(74) *Attorney, Agent, or Firm*—Duke W. Yee; Jeffrey S. LaBaw; Wayne P. Bailey

(57) ABSTRACT

The present invention provides a method, apparatus, and computer implemented instructions for executing cryptographic operations. Responsive to a request to perform a cryptographic operation, one (or more) of a software process and a hardware process is selected for performing the cryptographic operation based on a policy which process results with available resources to perform the cryptographic operation to form a selected process. The cryptographic operation is performed using the selected process. Necessary object conversions, which is transparent to the application, is carried out in order to convert objects to usable forms of the selected process(es).

23 Claims, 3 Drawing Sheets

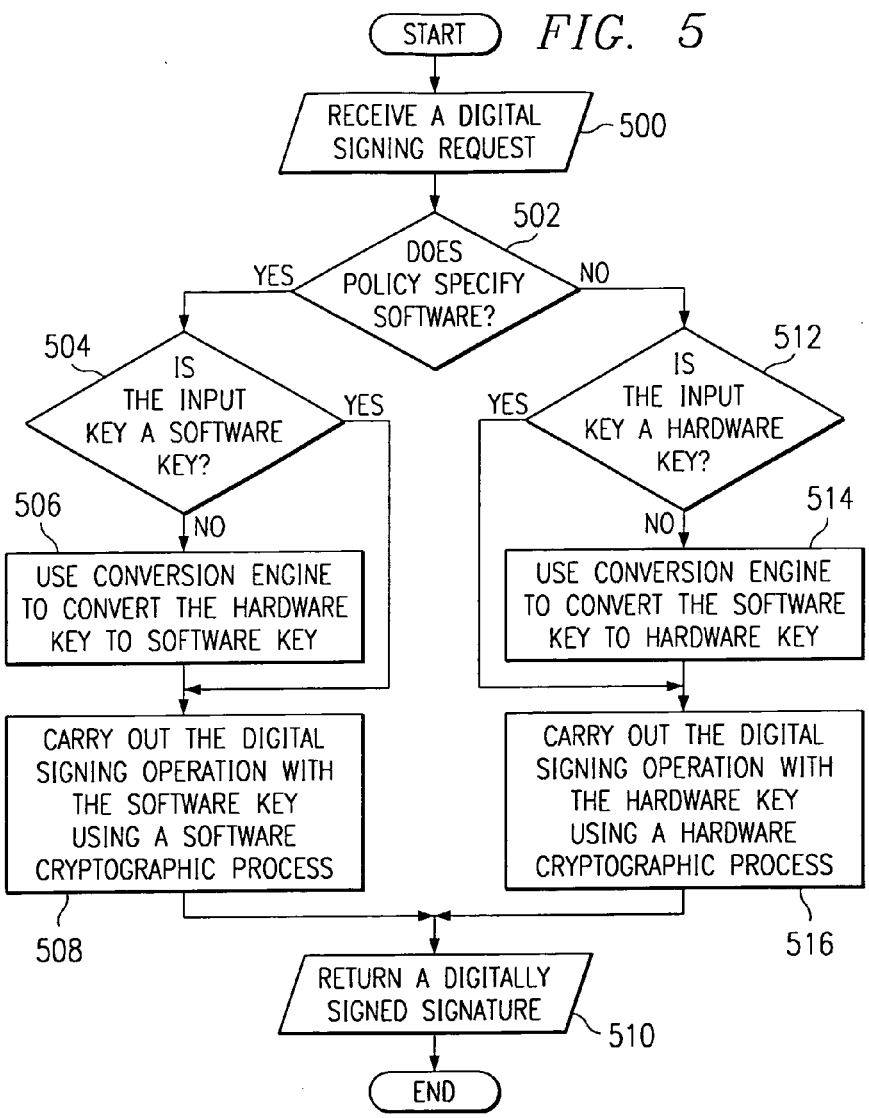
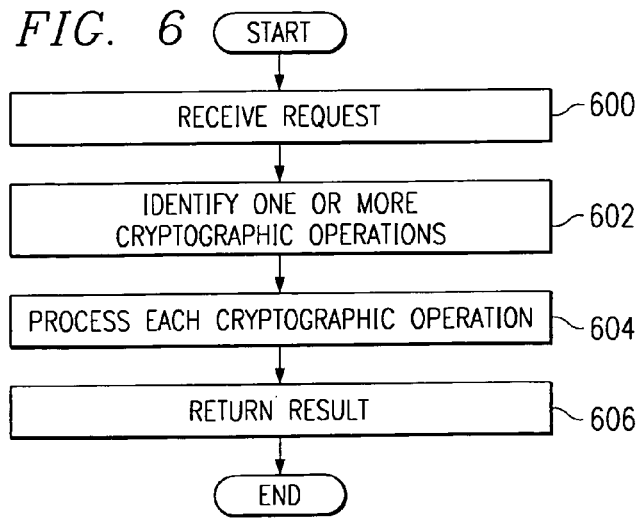

METHOD AND APPARATUS FOR DUAL HARDWARE AND SOFTWARE CRYPTOGRAPHY

BACKGROUND OF THE INVENTION

1. Technical Field

The present invention relates generally to an improved data processing system, and in particular to a method and apparatus for performing cryptography operations. Still more particularly, the present invention provides a method, apparatus, and computer implemented instructions for a dual hardware and software cryptography system.

2. Description of Related Art

Cryptography is the art and science of keeping information secure. A person who does not know the method used to change the information to keep it secure cannot copy the method used or reverse the change. The basic components of cryptographic systems are used to encipher (scramble) information so that it is difficult to determine the meaning without the appropriate key or keys to decipher (unscramble) the information. The components include cryptographic algorithms (mathematical functions) for enciphering or deciphering information and keys (strings of information that cause a cryptographic algorithm to encipher or decipher in a distinctive way). Symmetric and asymmetric are two examples of cryptographic systems. Symmetric systems use the same key to encipher and decipher. This system is also referred to as a secret key algorithm.

In contrast, asymmetric systems generate and use different keys to encipher and decipher a secure key pair. With this key pair, consisting of a public key and a private key, only one key can decipher what the other enciphers. Asymmetric key pairs are used in creating digital signatures and transporting symmetric keys. In the past, most encryption systems only used symmetric cryptography. The problem with symmetric cryptography, however, is the difficulty encountered in distributing keys to targeted recipients. Since symmetric cryptography uses the same key for enciphering and deciphering, a person has to use creative and difficult means to prevent the unwanted from intercepting the key. If a third party were to intercept the key, they could use it to decipher anything it was used to encipher.

A solution to this problem is public key cryptography which uses asymmetric cryptography to transport symmetric keys. In such a system, a recipient's public key is used to encipher a symmetric key. Once enciphered, the symmetric key can only be easily deciphered using the corresponding private key.

The Internet and other networked environments are full of hackers, viruses, eavesdroppers, thieves, terrorists, and other threats to information privacy and control. Cryptography is necessary because it helps individuals and organizations protect themselves from these threats. For years, cryptography has been predominantly used by government intelligence agencies, military forces, and the banking industry. Today, others are beginning to realize the benefits and the necessity of cryptography.

Cryptographic systems may be implanted using hardware. As an overview summary, hardware cryptography implementation is required in certain industrial sectors such as financial areas. It is important that confidential information is kept in secure location. A classic example is the storage of private key. Although the access to the private key can be limited by the data structure/nature in software (e.g. declaring the key as a private attribute which cannot be accessed by any outside application), the memory that stores the key is not protected by secure means. An intruder/adversary can read the key information by brute memory reading or any work around. Besides secure storage, hardware also provides an environment to execute operations that involve confidential data such as digital signature and encryption. Hardware provides a secure means for storing confidential data and executing sensitive operations.

Cryptographic systems also may be implemented in software. In this type of implementation, the speed of a software implemented operation depends solely on the operating machine. The performance of software implementation can be improved by various techniques such as multithreading. The execution time is not necessary proportional to the size of input data once the code is loaded to memory since no more Input/Output (I/O) is needed and thus repetitive operation would yield in smaller overhead and shorter execution time.

Hardware, on the other hand, due to extra connections to the operating machine and limited memory (relatively smaller to the operating machine), has a limited and costly performance.

SUMMARY OF THE INVENTION

The present invention provides a method, apparatus, and computer implemented instructions for executing cryptographic operations in a single architecture that embraces the advantages of both software and hardware implementations. Responsive to a request to perform a cryptographic operation, one of a software process and a hardware process is selected (whether specified by the application or picked by the architecture according to some policy) for performing the cryptographic operation based on a policy which process results with available resources to perform the cryptographic operation to form a selected process which will yield an optimal performance. The cryptographic operation is personnel using the selected process.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart of a process used for processing a request for a digital signed signature in accordance with a preferred embodiment of the present invention; and FIG. 6 is a flowchart of a process used for processing a request from an application in accordance with a preferred embodiment of the present invention.

DETAILED DESCRIPTION OF THE PREFERRED EMBODIMENT

Figure 1:
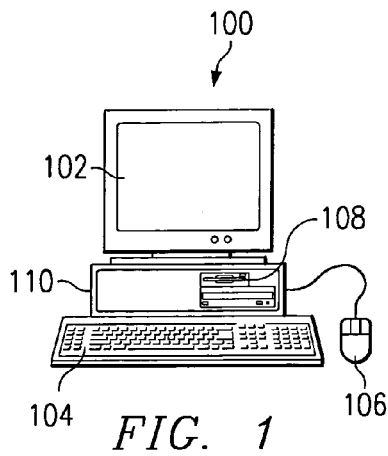
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
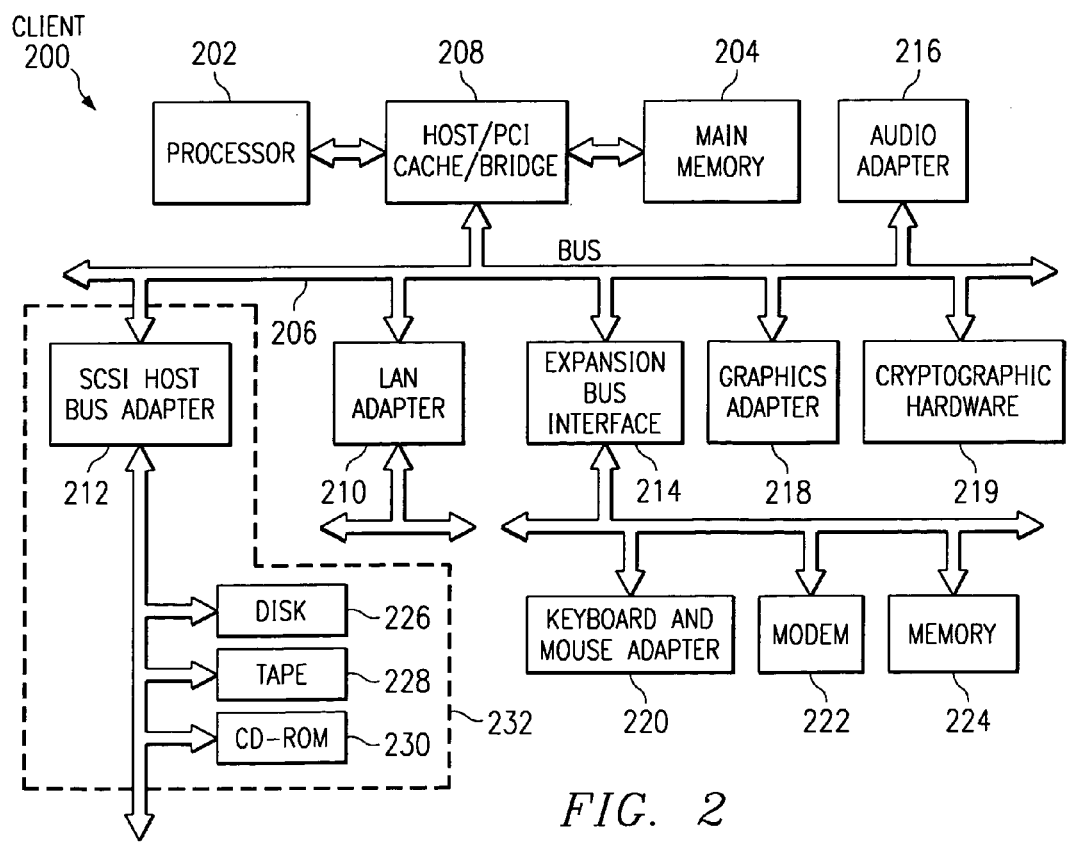
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and cryptographic hardware 219 are connected to PCI local bus 206 by add-in boards inserted into expansion slots. Cryptographic hardware 219 provides cryptographic processes, such as cryptographic algorithms for processing data. For example, cryptographic hardware 219 may be used to encrypt data, decrypt data, and generate digital signatures.

Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as a JAVA system may run in conjunction with the operating system and provides calls to the operating system from Java programs or applications executing on data processing system 200. "JAVA" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/ or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

The present invention provides a method, apparatus, and computer implemented instructions for dual hardware and software cryptography. Disclosed is an architecture for dual hardware and software cryptography. Cryptography algorithms (public/private key, message digest, message authentication code) have been implemented through various vendors on different hardware and software. However, the effectiveness of these solutions has been limited by the forms of the implementation. The throughput of an algorithm is bounded by the availability on the hardware implementation while the security level (data is vulnerable in memory) is lowered by the software implementation. The present invention provides a secure and yet efficient and flexible architecture to utilize both hardware and software functionalities while minimizes the weakness of hardware and software cryptography implementations.

Figure 3:
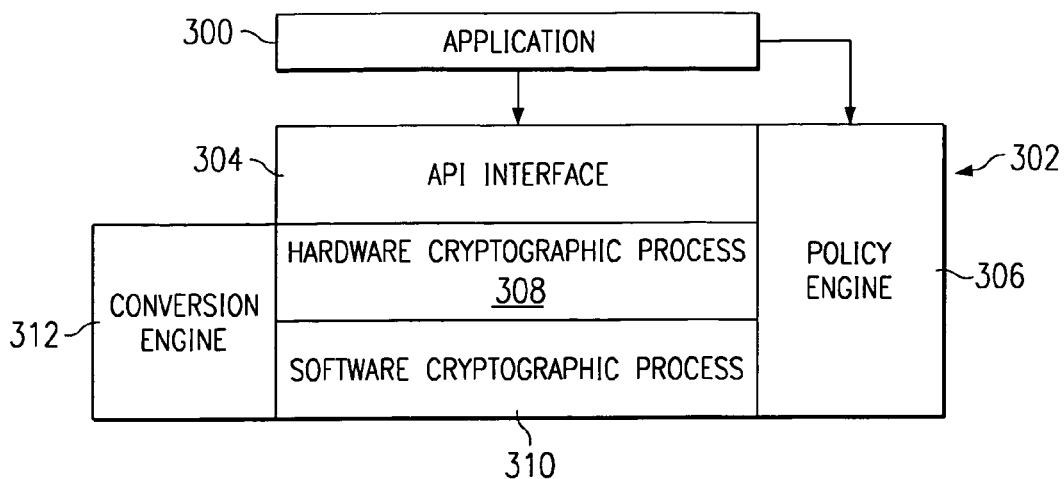
FIG. 3 is a diagram of a dual hardware and software cryptography in accordance with a preferred embodiment of the present invention.

Turning now to FIG. 3, a diagram of a dual hardware and software cryptography system is depicted in accordance with a preferred embodiment of the present invention. In this example, application 300 may send requests for cryptographic operations to cryptography system 302, which includes an application programming interface (API) 304, a policy engine 306, a hardware cryptographic process 308, a software cryptographic process 310, and a conversion engine 312.

API interface 304 provides a common interface for applications requiring cryptographic operations. API interface 304 allows application to make calls or send requests for cryptographic operations without requiring application to format these calls or requests a particular process within cryptographic systems 302. Thus, if different hardware and software processes are implemented for hardware cryptographic process 308 and software cryptographic process 310, applications are not required to make different calls and request for each particular process. API interface 304 translates the request or call from an application, such as, application 300, into the appropriate format for a particular cryptographic process within cryptographic system 302.

Hardware cryptographic process 308 and software cryptographic process 310 represent hardware and software implementations of cryptographic algorithms. For example, these algorithms may include encryption algorithms used to encrypt data and create digital signatures. For example, public key algorithms may be implemented in both hardware and software form.

Public-key algorithms are complex mathematical equations using very large numbers. In practice, these algorithms are typically used only at critical points, such as for exchanging a symmetric key between entities or for signing a hash of a message (a hash is a fixed-size result obtained by applying a one-way mathematical function, called a hash algorithm, to data).

Using other forms of cryptography, such as symmetric-key cryptography, in combination with public-key cryptography optimizes performance. Public-key encryption provides an efficient method to send someone the secret key that was used when a symmetric encryption operation was performed on a large amount of data. Digital signatures may be produced by combining public-key encryption with hash algorithms to produce a digital signature. A hash is also referred to as a message digest. A hash is the conversion of a piece of data of any length into a non-reversible-fixed length number by applying a one way mathematical function called a hash algorithm to the data.

Hardware cryptographic process 308 and software cryptographic process 310 may implement any of the known algorithms, such as, for example, Rivest-Shamir-Adleman (RSA) cryptographic algorithms, Digital Signature Algorithm (DSA), and Diffie-Helman Cryptographic algorithms.

Policy engine 306 is used to identify whether hardware cryptographic process 308 or software cryptographic process 310 will be used to perform the cryptographic operation. Policy engine 306 may make this decision in many different ways, depending on the particular implementation. In the depicted examples, application 300 may select whether hardware cryptographic process 306 or software cryptographic process 310 is to be used.

If, however, no particular type of process is requested by application 300, policy engine 306 may select the particular type of process using a predefined set of rules. For example, policy engine 306 may include rules tat select the particular process based on available resources in the data processing system. The rules nay select the process, which uses the least amount of available resources or particular resources. The particular process any also be selected based on the process that provides the fastest processing. The set of rules may leverage the workload of the hardware/software. For example, if hardware is in use by another application, software will be used, and this mis will be a predefined dominant factor. An example of another rule is if the service is encryption, only hardware implementation is used. This type of rule is performance oriented to provide the fastest implementation. Further, in these examples, policy engine 306 is not statically configured. An application can configure policy engine 306 dynamically as desired. Different applications can concurrently run on this architecture with different configurations. It is up to the application whether it wants to dynamically change the configuration or predefine the usage of each algorithm services.

Conversion engine 312 is employed to translate objects, such as keys into the appropriate form for use. Since the representations of objects are different in software and hardware, cryptography system 302 through conversion engine 312 provides the necessary conversion of objects from software to hardware representations. Take the example of key representation. In software, the actual key values are stored in the key object and can be referenced by applications. In hardware, since the keys are kept in the hardware (and maybe referenced by some labels or tags), applications are prohibited from accessing the actual key values.

Without the conversion from one form to another, limits are present between the interoperability of the software and hardware processes. With conversion engine 312, keys (and any other object) may be converted from one form to another form. Therefore, if cryptography system 302 realizes that a software object is interoperating with a hardware object, conversion engine 312 will convert an object from one form to another form so that interoperability within the architecture is preserved.

In this example, the software form of an object, such as a key, can be inserted to the hardware storage and is given/provided tags to reference it.

Alternatively, in this storage the hardware key can be retrieved from the hardware storage and has the key values stored in the software representation. Existing software implementations can use conversion engine 312 to port the software keys to hardware and use a more secure key storage. If hardware implemented application prefers performance and cost over security, the hardware objects can be converted to software representation by using conversion engine 312 and achieve better performance by using purely software.

Figure 4:
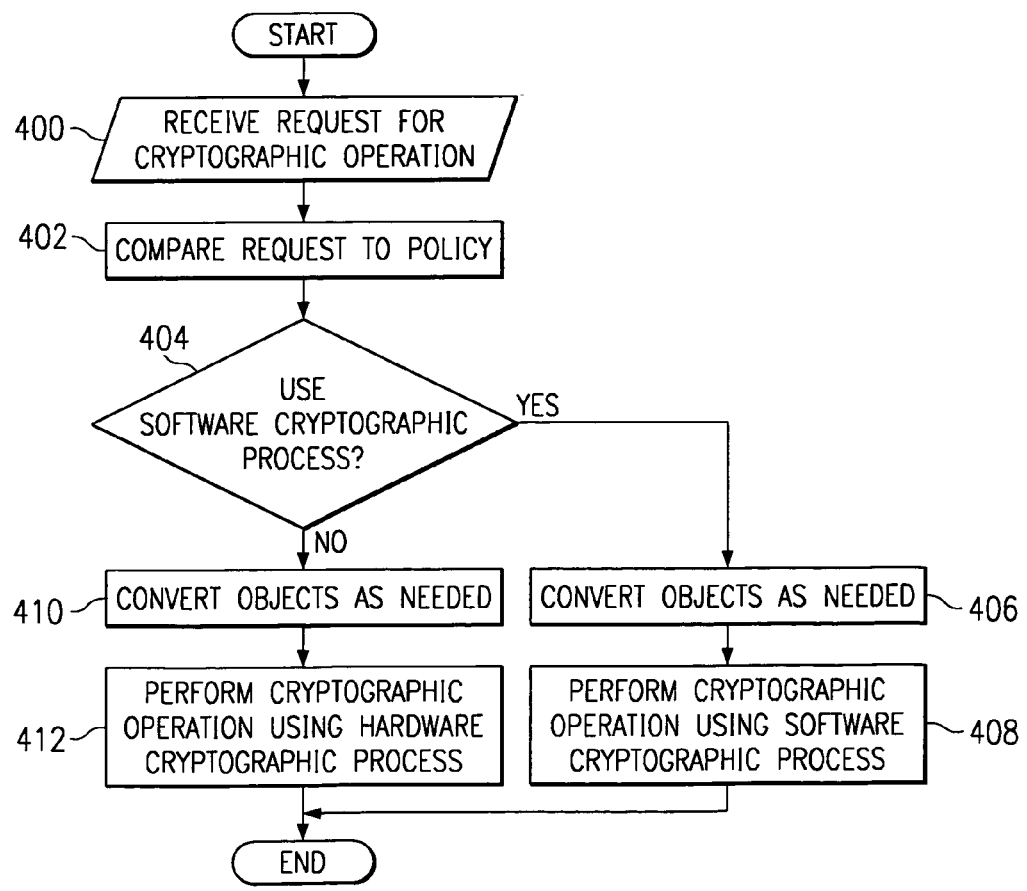
FIG. 4 is a flowchart of a process used for processing requests for cryptographic operations in accordance with a preferred embodiment of the present invention.

Turning next to FIG. 4, a flowchart of a process used for processing requests for cryptographic operations is depicted in accordance with a preferred embodiment of the present invention. The processes illustrated in FIG. 4 may be implemented in a cryptography system or apparatus, such as, cryptography system 302 in FIG. 3. The process begins by receiving a request for a cryptographic operation (step 400). The request in this example is received using an API interface, such as API interface 304 in FIG. 3. The request is then compared or examined with a policy (step 402). The policy is a set of rules governing how a cryptographic operation will be performed. The request may specify a particular type of process may be used. In such a case, the policy may allow this specification how the cryptographic operation is to be performed. Alternatively, the policy may disallow a specification of a particular process and select the process based on other factors, such as available resources and speed of completion.

Next, a determination is made as to whether a software cryptographic process is to be used (step 404). If a software cryptographic process is to be used, then objects are converted as needed (step 406). This step may be performed by a conversion engine, such as conversion engine 312 in FIG.

3. The cryptographic operation is then performed using the software cryptographic process (step 408) with the process terminating thereafter. Turning back to step 404, if a software cryptographic process is not to be used, then objects are converted as needed for the hardware cryptographic process (step 410). The cryptographic operation is then performed using the hardware cryptographic process (step 412) with the process terminating thereafter.

With reference now to FIG. 5, a flowchart of a process used for processing a request for a digital signed signature is depicted in accordance with a preferred embodiment of the present invention. The process illustrated in FIG. 5 is a more detailed example of the processing of the request by cryptography system 302.

The process begins by receiving a digital signing request (step 500). A determination is made as to whether the policy specifies using software process for this request (step 502). If the policy specifies using software, then a determination is made as to whether the input key is a software key (step 504). If the input key is not software key, a conversion engine is used to convert the hardware key into a software key (step 506). Then, the digital signing operation is carried out using the software key and a software cryptographic process (step 508). A digitally signed signature is then returned to the requestor (step 510) with the process terminating thereafter.

With reference again to step 504, if the input key is a software key, the process proceeds directly to step 508, skipping the conversion step.

Turning back to step 502, if the policy does not specify the use of a software process, a determination is made as to whether the input key is a hardware key (step 512). If the input key is not hardware key, a conversion engine is used to convert the software key into a hardware key (step 514). Then, the digital signing operation is carried out using the hardware key and a hardware cryptographic process (step 516) with the process then proceeding to step 510 as described above.

With reference now to FIG. 6, a flowchart of a process used for processing a request from an application is depicted in accordance with a preferred embodiment of the present invention. The process illustrated in FIG. 6 is used to identify whether more than one cryptographic operation is to be performed and to handle the performance of each identified operation.

The process begins by receiving a request (step 600). Thereafter, one or more cryptographic operations are identified by the request (step 602). The mechanism of the present invention allows for breaking down a request into different cryptographic operations and selecting the type of cryptographic processes best for each operation based on a policy. Many of the cryptographic algorithms are a combination of several cryptographic algorithms. For instance, digital signature composes of message digest and public private key encryption. Less sensitive operations such as message digest may be performed by the faster implementation, software, while the more sensitive operation, encryption, may be performed by the more secure hardware.

Next, each identified cryptographic operation is then performed or processed (step 604). The processing of the cryptographic operation in step 604 may be implemented by using a process described in FIG. 3. The result is then returned to the originator of the request (step 606) with the process terminating thereafter.

Thus, the present invention provides a method, apparatus, and computer implemented instructions for a secure and yet well performing cryptography implementation. The mechanism of the present invention combines the advantages of both hardware and software implementations and provides a flexible and configurable cryptography implementation. This mechanism utilizes the advantages of the two kinds of cryptographic implementations, hardware and software, to complement each other.

Besides utilization of the software and hardware features, this mechanism also provides a flexible means for the users to determine the usage of each kind service. An application that does not require hardware implementation can configure the mechanism to provide software implemented services only through a policy engine. Another application that exclusively requires hardware services can specify that only hardware services are desired.

From the user/application point of view, the usage of the services are the same since the API interface are the same for both software and hardware implementations. However, the ability to configure the usage of different forms of implementation greatly increases the performance and reduces the cost of cryptographic services. Less restricted operations are done by cheaper but faster software while sensitive operations are carried out by more secure hardware.

The performance of an operation using hardware or software may differ depending on a particular implementation. The performance also may depend on the size and nature of the operating data. For example, if the input data is small, hardware may provide a better performance than software. If the input data is large, since the operation code is already loaded to memory (overhead is the same for any data size), software provides better performance. The overhead in hardware in this case is proportional to the data size.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for executing cryptographic operations, the method comprising:
responsive to a request to perform a cryptographic operation, dynamically selecting between one of a software process and a hardware process within the data processing system in a single architecture for performing the cryptographic operation based on a policy, to form a selected process; and performing the cryptographic operation using the selected process, wherein the cryptographic operation is an encryption of data using a key, and wherein the step of performing the cryptographic operation includes converting the key to a form useable by the selected process if the key is in an unusable form by the selected process, wherein the key is a software key and the selected process is the hardware process and the step of converting the key comprises converting the software key into a hardware form useable by the hardware process for performing the cryptographic operation.

2. The method of claim 1, wherein the policy includes selecting the one based on available resources to perform the cryptographic operation.

3. The method of claim 2, wherein the available resources include available processing resources and memory.

4. The method of claim 1, wherein the policy includes selecting the one resulting in a fastest completion of the cryptographic operation.

5. The method of claim 1, wherein the selecting step includes:
selecting the one using a preference associated with the request.

6. A method in a data processing system for executing cryptographic operations, the method comprising:
responsive to a request to perform a cryptographic operation, dynamically selecting between one of a software process and a hardware process within the data processing system in a single architecture for performing the cryptographic operation based on a policy, to form a selected process; and
performing the cryptographic operation using the selected process, wherein the cryptographic operation is an encryption of data using a key, wherein the key is a hardware key and the selected process is the software process and further comprising:
converting the hardware key into a software form useable by the software process for performing the cryptographic operation.

7. The method of claim 6, wherein the policy comprises a set of rules used to minimize available resources consumed in performing the cryptograpluc operation.

8. The method of claim 6, wherein the policy comprises a set of rules used to maximize a speed at which the cryptographic operation is performed.

9. The method of claim 6, wherein the cryptographic operation is one of a message digest and a public-private key encryption.

10. The method of claim 6, wherein the request is received from an application.

11. The method of claim 10, wherein the request is received from the application using an application program interface call made by the application.

12. A data processing system for executing cryptographic operations, the data processing system comprising:
selecting means for dynamically selecting between one of a software process and a hardware process within the data processing system in a single architecture for performing a cryptographic operation based on a policy, to form a selected process in response to a request to perform the cryptographic operation; and
performing means for performing the cryptographic operation using the selected process, wherein the cryptographic operation is an encryption of data using a key, and wherein the performing means includes converting means for converting the key to a form useable by the selected process if the key is in an unusable form by the selected process, wherein the key is a software key and the selected process is the hardware process and the converting means comprises means for converting the software key into a hardware form useable by the hardware process for performing the cryptographic operation.

13. The data processing system of claim 12, wherein the policy includes selecting the one based on available resources to perform the cryptographic operation.

14. The data processing system of claim 12, wherein the policy includes selecting the one resulting in a fastest completion of the cryptographic operation.

15. The data processing system of claim 12, wherein the selecting means includes:
selecting means for selecting the one using a preference associated with the request.

16. A data processing system for executing cryptographic operations, the data processing system comprising:
selecting means for dynamically selecting between one of a software process and a hardware process within the data processing system for performing a cryptographic operation based on a policy, to form a selected process in response to a request to perform the cryptographic operation; and
performing means for performing the cryptographic operation using the selected process, wherein the cryptographic operation is an encryption of data using a key, and wherein the performing means includes converting means for converting the key to a form useable by the selected process if the key is in an unusable form by the selected process, wherein the key is a hardware key and the selected process is the software process and the converting means comprises means for converting the hardware key into a software form useable by the software process for performing the cryptographic operation.

17. The data processing system of claim 16, wherein the policy comprises a set of rules used to minimize available resources consumed in performing the cryptographic operation.

18. The data processing system of claim 16, wherein the policy comprises a set of rules used to maximize a speed at which the cryptographic operation is performed.

19. The data processing system of claim 16, wherein the cryptographic operation is one of a message digest and a public-private key encryption.

20. The data processing system of claim 16, wherein the request is received from an application.

21. The data processing system of claim 20, wherein the request is received from the application using an application program interface call made by the application.

22. A data processing system comprising:
a bus system;
a communications unit connected to the bus, wherein data is sent and received using the communications unit;
a memory connected to the bus system, wherein a set of instructions are located in the memory; and
a processor unit connected to the bus system, wherein the processor unit executes the set of instructions to (i) dynamically select between one of a software process and a hardware process within the data processing system in a single architecture for performing a cryptographic operation based on a policy, to form a selected process; (ii) perform the cryptographic operation using the selected process, wherein the cryptographic operation is an encryption of data using a key, wherein the key is a hardware key and the selected process is the software process; and (iii) convert the hardware key into a software form useable by the software process for performing the cryptographic operation.

23. A data processing system comprising:
a bus system;
a communications unit connected to the bus, wherein data is sent and received using the communications unit;
a memory connected to the bus system, wherein a set of instructions are located in the memory; and
a processor unit connected to the bus system, wherein the processor unit executes the set of instructions to (i) dynamically select between one of a software process and a hardware process within the data processing system in a single architecture for performing a cryptographic operation based on a policy, to form a selected process; (ii) perform the cryptographic operation using the selected process, wherein the cryptographic operation is an encryption of data using a key, wherein the key is a software key and the selected process is the hardware process; and (iii) convert the software key into a hardware form useable by the hardware process for performing the cryptographic operation.

* * * * *